United States Patent
Bezombes

[11] 3,801,298
[45] Apr. 2, 1974

[54] SUPPORTING AND TEMPERING BENT GLASS PLATES
[75] Inventor: Albert Bezombes, Paris, France
[73] Assignee: Saint-Gobain Industries, Neuilly sur Seine, France
[22] Filed: Mar. 21, 1972
[21] Appl. No.: 236,667

[30] Foreign Application Priority Data
Mar. 22, 1971   France ............................. 71.09930

[52] U.S. Cl. .................................... 65/104, 65/351
[51] Int. Cl. ........................................... C03b 27/00
[58] Field of Search ............ 65/104, 114, 348, 349, 65/350, 351, 107

[56] References Cited
UNITED STATES PATENTS
3,545,951   12/1970   Nedelec ............................... 65/104

*Primary Examiner*—Arthur D. Kellogg
*Attorney, Agent, or Firm*—Pennie & Edmonds

[57] ABSTRACT

Method and apparatus for supporting and tempering hot glass plates horizontally by flows of cooling fluid applied to the surfaces thereof which comprises gripping the glass between upper and lower spaced supports of which substantially all of the lower conform fully to the curvature of the glass, and substantially all of the upper have only spot contact therewith.

12 Claims, 5 Drawing Figures

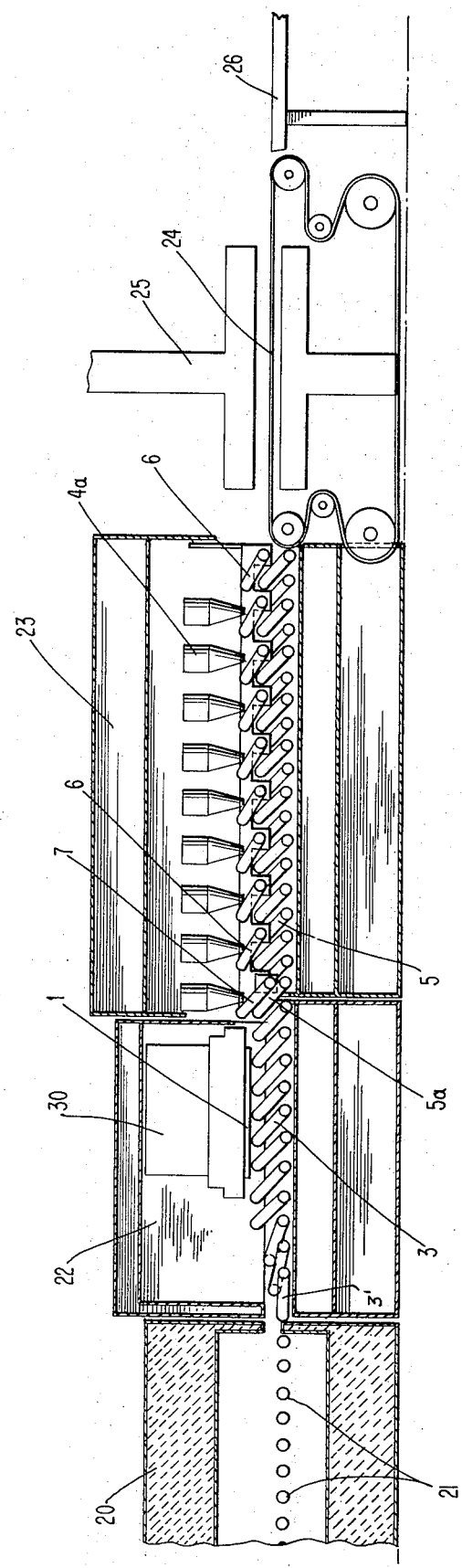

SUPPORTING AND TEMPERING BENT GLASS PLATES

This invention relates to the tempering of hot glass plates, particularly at the same time when they are still above the strain point and are issuing from bending apparatus after having been bent. A prime use of the invention is in making automobile windshields.

U.S. Pat. No. 3,545,951 describes a bending apparatus for plastic sheets, either organic or inorganic, notably glass plates, which is made up of a series of rods, shafts, or rollers arranged in a curve, each being pivotable around an axis passing through its extremities, which permits rods to be adjusted to different positions to impart greater or less curvature to the plates from no curvature when the rods lie flat to maximum curvature corresponding to the curvature of the shafts themselves when they are upright. This can be followed at the left end of FIG. 5. From maximum curvature at an angular elevation of 90° to no curvature when the rods lie flat, each intermediate angle produces a different curvature and, the curvature of the rods of the lower bank being the same as that of the rods in the bending section, and fixed at the same angle, they will exactly fit the bent plate and preserve its contour during tempering.

In FIG. 5 the bending section illustrates the pressing of the hot plate of glass between an upper, rigid shaping form and the curved rods to bend it. It also illustrates the use of similarly curved rods for transportation and support in the tempering section, and a second series of curved rods above and near the transport series. This second row has several uses: It permits symmetrical cooling by the tempering blowers by establishing substantially the same loss of heat, the same evacuation of cooling air, and the same rate and amount of heat exchange on the upper and lower faces of the plate, which produces symmetrical tempering, which was not the case when the blowing air, striking the upper face was unopposed by rods or rollers while the blown air striking the lower face was channeled into a different flow pattern on the lower face and produced a different degree of temper; the upper rank of curved rods keeps the glass plates exactly aligned upon the lower rank so that they do not twist or turn under the impact of the jets, do not float, are not laterally displaced, and are not directionally affected by warpings in the soft sleeves that cover the rollers.

A major object of the present invention is to make the application of the cooling air more equal, to make a more perfectly tempered plate, to prevent deviation of the plate under the force of the cooling jets, to baffle upstream flow of cooling fluid on both faces of the plate, and to improve the apparatus so as to attain these ends.

These objects are accomplished, generally speaking, by a method of support and a method of tempering and by an apparatus described hereinafter in their preferred forms.

It is a characteristic of the invention that the upper rods in the tempering zone are differently inclined than the lower rods, producing an effective radius of curvature longer in them than in the arcs of the curved supporting rods and in consequence longer than the radius of curvature of the bent glass. The longer radius is valuable for several reasons:

When the glass cools it is subject to expansions or contractions which induce temporary deformations. If the radii of the upper and lower rollers (rods) are the same the glass gripped between them could only undergo limited deformations, its internal mobility would be restricted and strains could arise capable even of rupturing the glass;

Experience has shown that it is very difficult to arrange the curvature of the rank of upper rods so that actual identity of curvature will exist between upper and lower rods, and so that the plate will follow an undeviating course parallel to the axis of the machine, but by supporting the glass throughout its width on the lower rank and engaging its upper surface only in spots aligned along its mid-length (which is accomplished by giving the upper curvature a longer radius) the bent plate is made to follow an undeviating course without difficulty;

It has been found that the new system has an additional advantage in that the wear on the refractory fiber sleeves which cover the rods is less and they last longer.

An additional characteristic of the invention is to give the first rod in the upper rank a curvature identical to that of the opposite rod in the lower rank, both corresponding precisely to the curvature of the plate. This arrangement establishes superior homogeneity of tempering above and below, to the extent that the glass itself has a homogeneous temperature as it issues from the bending apparatus, by baffling air currents from the blowing jets which seek to move upstream. Thus, these wandering currents are arrested on both faces of the glass. Inasmuch as the radius of the upper rank or series of rods provides a curvature more gradual than the lower, the ends of the curves would clear the glass and allow currents to wander upstream and cool the upper face of the glass before the cooling of the lower face begins, establishing dissimilar tempering and introducing deformations that cannot be completely compensated for either by dissymmetry in heating or dissymmetry in cooling the glass.

By giving the leading rod on the upper face the same conformation as the lower rod both constitute baffles to currents wandering upstream and symmetry of cooling is attained. Mechanically the upstream rod on the upper side is provided with independent means of adjustment so that it can be manipulated into position separately from the remainder of the rods in the bank. It is constructed so that it can be inclined at a different angle and to have an independent adjustability, which may be both vertical and arcuate. For instance it may be mounted in vertically adjustable bearings so that the glass will be gripped throughout its width between the upper and lower rods.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a diagrammatic view in vertical section of a portion of the bending section and of the tempering section of a continuous furnace, many details of engineering construction omitted and hatching omitted because of small size of the parts to be hatched;

FIG. 5 is a diagrammatic longitudinal, vertical section through an operative furnace including the invention.

Figure 1:
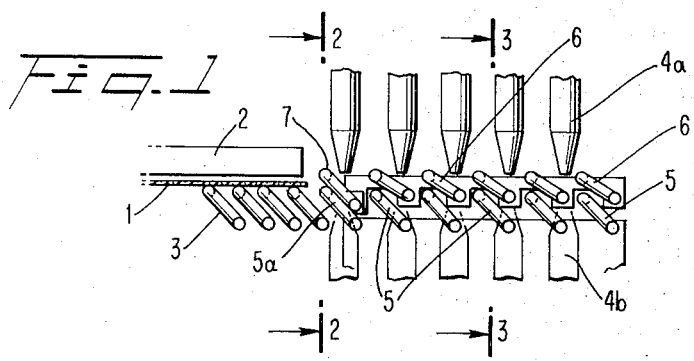

We begin with FIG. 5 which illustrates at 20 a heating oven of any known type within which glass plates 1, cut to the size of the use, for instance an automobile window, are heated to a temperature above the strain point, at which they can undergo bending and tempering. They pass through the oven on rollers 21 and are received upon supporting rods 3 (FIG. 1) which are all rotated to the flat position shown at 3'. The rods have roller surfaces covered by sleeves of refractory woven fabric. For constructional detail see the patent referred to. The plate 1 passes over the horizontal rods and when it is below the shaping form 30 the rods are pivoted to upright position, pressing the plate against the lower face of the form and bending it to its final shape. It then progresses into the tempering section 23 where it is received upon rods 5 of identical shape pivoted to the same angle so that the shape of the bent plate is supported throughout its width, the spacing of all rods being such that there is no tendency of the hot sheet to sag between rods. The sheet is still above the strain point and capable of being tempered.

Figure 4:
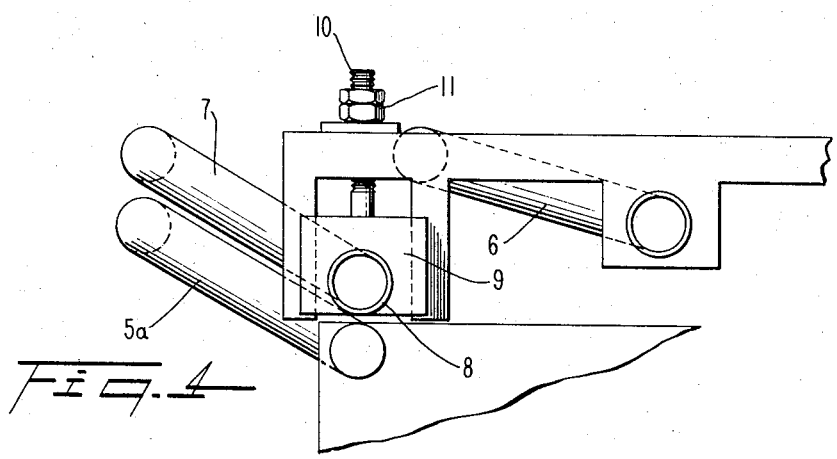
FIG. 4 is a diagrammatic end elevation of a vertically adjustable rod, on enlarged scale.

Above the rollers 5 in the tempering section are bent roller rods 7 and 6 each of which insofar overlies its companion rod 5 that no bending moment will be applied to the glass when they grip it (FIG. 4). The first of the upper series or gang of rods 7 is of the same shape as its matching rod in the lower bank and both are of curvature matching that of the bent glass (FIG. 2) so that from side to side they engage its surfaces. Rod 7 is independently mounted and controlled, but the rods 6 are pivotable as a unit. The rods 3 of the bending section must be lowered and raised for each bending operation but the rods 5 always remain set in a position which accepts and conforms to the shape of the bent plate, 5a being of the same shape and mounted in bank. The bank 7, 6 also remains in set position. The resilient surfaces of the rods allow sufficient space between the cores of the upper and lower rods that no problem arises as the plate enters between them.

Figure 2:
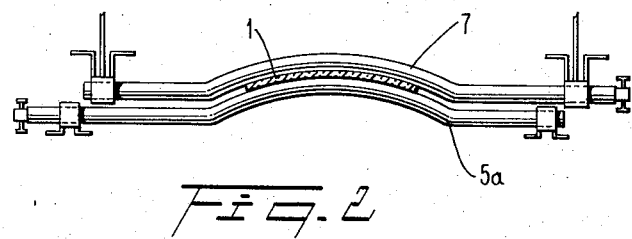
FIG. 2 is a section on line 2—2 of FIG. 1, looking downstream.
Figure 3:
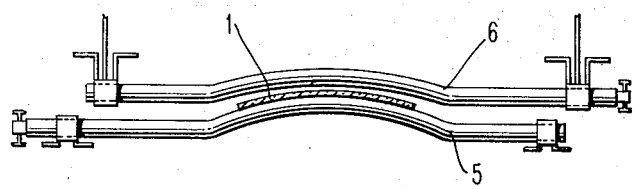
FIG. 3 is a section on line 3—3 of FIG. 1.

The relation of the plate to the first pair of rods of the tempering section is shown in FIG. 2. The relation of the upper and lower pairs in the remainder of the tempering section is shown in FIG. 3, the lower rod having full contact side to side of the plate and upper rod having only spot contact centrally located.

Above the course of the glass are blowing nozzles 4a and below it are blowing nozzles 4b, matching each other in volume and temperature in the preferred form of the invention to produce equal temper in both faces of the sheet. The lower blowers are hidden in FIG. 5.

During its passage through the tempering apparatus the sheets are cooled below the strain point and can be received upon the carrier belt 24 without fear of damage, being carried thence between two cooling surfaces 25 which reduce it to handling temperature and discharge it upon table 26.

It will be seen on FIG. 1 that the plate 1, after being heated, passes to a position between an upper, rigid form 2 and a bed of lower curved rollers, is bent as they pivot and lift it against the form, and passes between the blowing nozzles 4a and 4b. In this position the glass is supported by the lower rank, all of which conform to the curvature of the plate as it comes from bending. The upper rods of the tempering section are so inclined that the radius of curvature is greater than the radius of the curves in the supporting bed 5. The difference in curvature is illustrated in FIG. 3, where it is apparent that the plate is pressed between the rods only at a spot in its middle. This pressure by a series of aligned spots serves to guide the plate on an undeviating path.

The first rod of the upper rank in the tempering section is so inclined that it conforms fully to the exact shape of the glass, as shown in FIG. 2, the glass being gripped equally between rods 5a and 7. The control of the inclination of all the other rollers of the upper rank is common, but the control of upper rod 7 is independent. Furthermore, the ends of rod 7, as shown in FIG. 4, are mounted in bearings 8, 9 which are adjustable in height by means of a screw 10, which is attached to the bearing block 9, and nuts 11 mounted on the screw above the guide frame which mounts the blocks 9 slidably.

The advantages of the invention have been described in the first part of this specification. To recapitulate: The strains in the glass are more evenly incorporated, establishing a superior product and reducing losses by breakage arising from unbalanced internal stresses. The early chilling of the upper surface by gusts of air escaping upstream is prevented, the rod 7 balancing rod 5 in baffling such flows. The flow of air above and below is channeled in like directions, further increasing the uniformity of tempering. Wandering of the hot glass on the supporting bed is prevented, reducing marking and deformation of the plate.

As many apparently widely different embodiments of the present invention may be made without departing from the spirit and scope thereof, it is to be understood that the invention is not limited to the specific embodiments.

What is claimed is:

1. Apparatus for the tempering of hot bent glass comprising a series of spaced, upper and lower, opposed horizontally arranged, arcuate supports for the glass, of which the upper supports have generally a more gradual curvature than the glass and said lower supports so as to provide only spot contact of the upper supports with the upper surface of the glass near the transverse center thereof when the upper supports are otherwise in closely spaced relation to the glass, and means to blow cooling gases against the upper and lower surfaces of the glass between said supports.

2. Apparatus according to claim 1 in which the lower series of supports conforms to the lateral curvatures of the glass and supports it throughout the width of the glass, and the first in the upper series of supports conforms fully to the lateral curvature of the glass to engage it throughout its width.

3. Apparatus according to claim 1 including pivot means mounting the arcuate supports, means to turn the supports in the pivot means, thereby changing the curvature of the supports effectively presented to the glass surface, and pivot means mounting the first support in the upper series of supports for pivotal movement independent of other supports in the upper series.

4. Apparatus according to claim 3 including means to vertically adjust the position of the last-named pivot means.

5. A method of bending and tempering glass plates in a continuous operation which comprises heating the plates in sequence to bending and tempering temperature, resting the plates in sequence upon a bed of curved rods lying flat, raising the rods to upright position and thereby pressing the plate against a shaping surface, transferring the bent plate to a supporting bed of curved rods having the curvature of the bent plate, pressing the plates against the supporting rods at spots located in vertical alignment with the bent rods therebeneath, and tempering the plate by jets of air.

6. A method according to claim 5 in which the pressing spots are aligned in the direction of motion of the plate.

7. A method according to claim 5 in which all of the rods of the lower bed engage the whole width of the plate, and the pressure applied from above extends throughout the width of the glass in the first position at which the plate arrives in the tempering zone.

8. Apparatus for tempering a hot transversely curved glass plate comprising a lower series of spaced transversely extending, longitudinally curved rollers for supporting and longitudinally transporting said plate, the curvature of said rollers and plate being complementary, whereby each said roller engages the plate across the entire width thereof, a corresponding upper series of rollers above the plate, and rollers of the upper series having a curvature more gradual than and generally complementary to the curvature of the opposed rollers of the lower series and being vertically spaced from the latter along the crest of the curved plate a distance generally corresponding to the thickness of the plate and divergent therefrom laterally toward the edges of the plate, and means for simultaneously projecting a cooling fluid against the upper and lower surfaces of the plate between said rollers.

9. Apparatus as defined in claim 8 wherein the rollers of the lower series are curved upwardly to engage the concave surface of the plate.

10. Apparatus as defined in claim 8 comprising means for pivotally supporting said rollers adjacent the ends thereof.

11. Apparatus as defined in claim 8 wherein one said roller at one end of said upper series has a curvature complementary to the curvature of the opposing roller of the lower series to thereby engage the upper surface of the plate across the full width thereof and function as a baffle to impede upstream flow of the cooling fluid.

12. Apparatus as defined in claim 11 wherein said one roller is mounted for vertical adjustment.

* * * * *

UNITED STATES PATENT OFFICE
CERTIFICATE OF CORRECTION

Patent No. 3,801,295      Dated April 2, 1974

Inventor(s) Albert Bezombes

It is certified that error appears in the above-identified patent and that said Letters Patent are hereby corrected as shown below:

Column 1, line 4, delete "same" before "time".
Column 5, line 23, for "glass" substitute --plate--.

Signed and sealed this 10th day of September 1974.

(SEAL)
Attest:

McCOY M. GIBSON, JR.      C. MARSHALL DANN
Attesting Officer      Commissioner of Patents